April 19, 1927.
C. M. LEE
1,625,323
AUTOMATIC GAS VALVE
Filed May 21, 1920
2 Sheets-Sheet 1
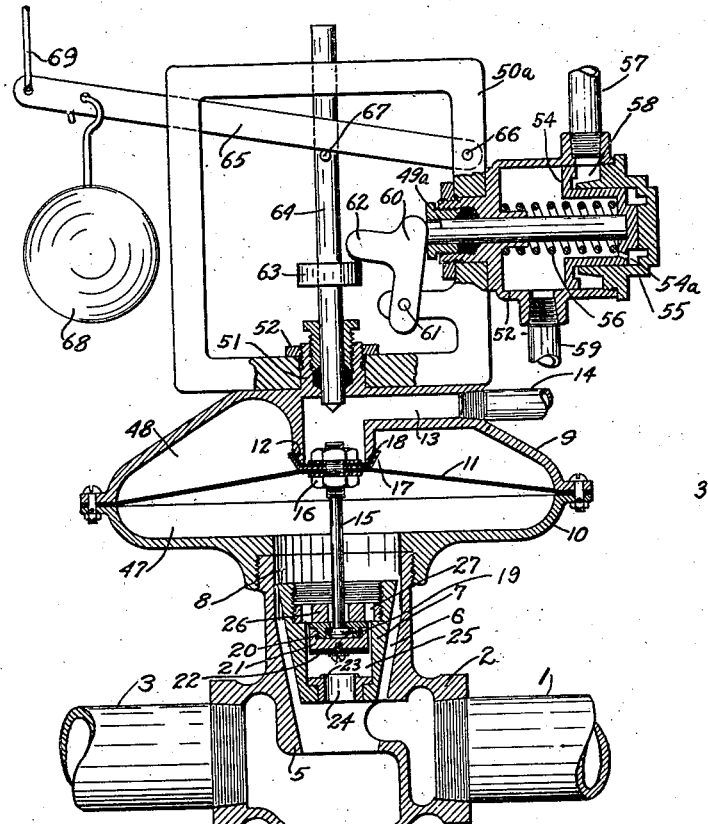
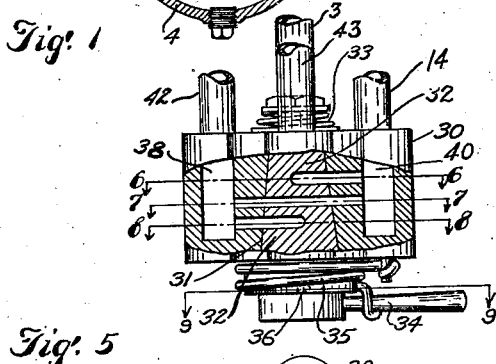
INVENTOR
Claire M. Lee
BY Brockett & Hyde
ATTORNEYS April 19, 1927.

C. M. LEE

AUTOMATIC GAS VALVE

Filed May 21, 1920

1,625,323

2 Sheets-Sheet 2

INVENTOR
Claire M. Lee
BY Brockett & Hyde
ATTORNEYS

Patented Apr. 19, 1927.

1,625,323

UNITED STATES PATENT OFFICE.

CLAIRE M. LEE, OF ELYRIA, OHIO, ASSIGNOR OF ONE-HALF TO GEORGE W. LEE, OF WAUSEON, OHIO.

AUTOMATIC GAS VALVE.

Application filed May 21, 1920. Serial No. 383,125.

This invention relates to automatic valves for controlling the flow of fluid pressure, such as valves for illuminating gas, gas for refrigerating systems, such as ammonia, or steam or compressed air. The invention is particularly applicable for illuminating gas supply systems, its general purpose being to automatically cut off the flow of gas when the pressure of the supply is reduced below a pre-determined amount or when some dangerous condition arises.

The object of the invention is to generally simplify and improve the construction and arrangement of the valve and its controlling means; to provide a valve which is positive in operation and insures safety under abnormal conditions; to provide a valve of this kind which does not depend for its operation upon springs, which includes but a single diaphragm or movable abutment, and in which friction of moving parts is largely eliminated; to provide a valve which automatically cuts off the flow of gas under unusual conditions but which in turn is controlled by a hand operated valve which can be placed at a point remote from the main supply controlling valve; and to provide a construction which insures safety in operation in case the movable abutment or diaphragm becomes punctured or because of wear or for other reasons cannot perform its usual functions.
Further objects of the invention are in part obvious and in part will appear more in detail hereinafter.

Figure 2:
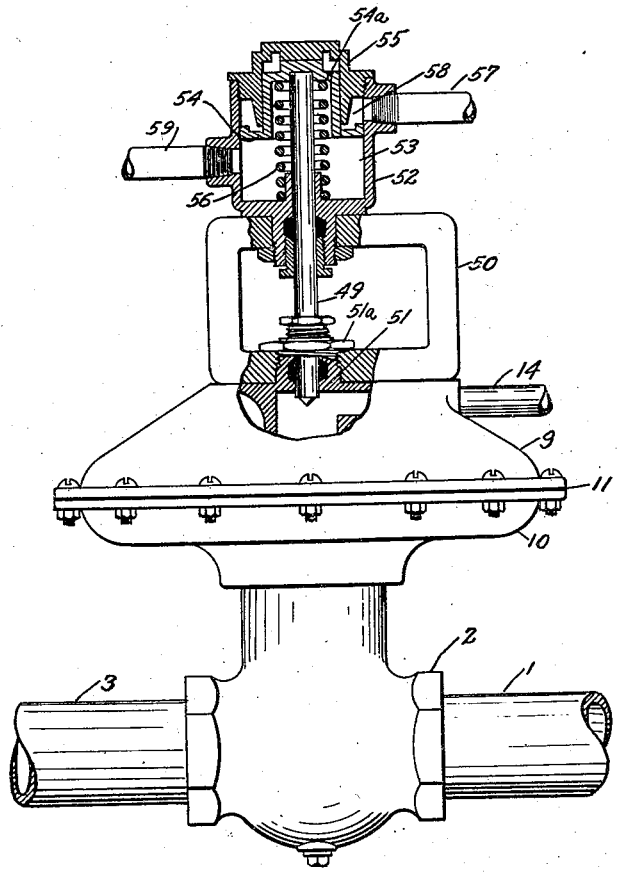
Figure 3:
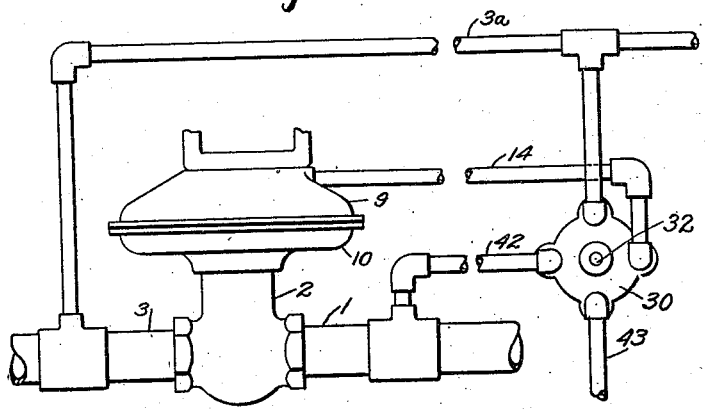

In the drawings, Fig. 1 represents a sectional elevation of one form of valve embodying the invention; Fig. 2 is an elevation partly in section illustrating another arrangement of automatic fire controlling means; Fig. 3 is a diagrammatic view illustrating the entire control system; Fig. 4 is a plan view of the manual controlling valve; Fig. 5 is a sectional elevation thereof on the line 5—5, Fig 4; Figs. 6, 7 and 8 are sectional plan views on the lines 6—6, 7—7, and 8—8, Fig. 5, respectively;
and Fig. 9 is a sectional plan view on the line 9—9, Fig. 5.

1 represents the fluid pressure supply main communicating by way of the valve 2 with a discharge pipe 3 leading to the various outlets where the fluid pressure supply is utilized, which in the case of gas, will be the various burners, stoves or other gas outlets. Valve 2 includes a casing 4 in which is a cross wall 5 provided with a tapered or conical seat 6 to receive the tapered valve plug 7, the upper end of which is slightly smaller in diameter than the cylindrical portion 8 of the valve body in which it travels. Upon the upper end of the valve casing is secured a casing including upper and lower members 9, 10 between which is clamped a flexible diaphragm or movable abutment 11. The upper member 9 of the diaphragm casing is provided with a centrally disposed relatively small valve seat 12 at the mouth of a passage-way 13 communicating with a pipe 14.

The valve 7 is supported by the diaphragm 11 which has secured to its center a valve rod or stem 15, the nut 16 for clamping the same also holding in place a concave metal washer 17, above which is a sealing washer 18, these members forming a valve co-operating with the seat 12. The lower end of rod 15 is provided with a round head 19 lying in the cavity of a nut 20 threaded into a check valve member 21 which is provided on its lower face with a composition washer 22 for co-operation with the valve seat 23 at the upper end of a channel 24 opening through the bottom of the valve body 7. The check valve, comprising members 20 and 21, has limited vertical motion in a cavity or recess 25 within the valve body 7, its downward motion in said cavity being limited by engagement with the valve seat 23 and its upward motion by a plug 26 threaded into the upper end of the body 7. This check valve is slightly smaller in diameter than the cavity 25, and the plug 26 is provided with a series of circumferentially spaced through ports 27, as a consequence of which, under certain conditions, pressure can flow through the center of valve member 7. The valve body 7 also can tilt slightly upon the head 19 so that it is self adjusting or self accommodating to its seat.

The valve so far described is utilized in connection with a manual controlling valve illustrated in detail in Figs. 4 to 8 inclusive. Said manual controlling valve includes a casing or body 30 provided with a central tapered opening 31 for a tapered valve plug 32 which is held to its seat in said opening by the spring 33. The plug is also provided on one end with an operating handle 34 and is connected to the casing by a spring 35 whose tendency is to rotate the valve in the direction opposite to that indicated by the arrows, Figs. 6, 7 and 8. Plug 32 is also provided with suitable stop devices for limiting its rotation, such as the pin 36 which engages the opposite ends of a slot or recess 37 in the valve casing. This valve plug normally occupies the position shown in the drawings, but by operation of the handle 34 may be turned through 90° in the direction of the arrows shown in Figs. 6, 7 and 8, and when released, the spring 35 returns it to normal position. In the valve casing 30 are four chambers or channels marked respectively 38, 39, 40 and 41.

This controlling valve may be located at any convenient point. Usually the main valve shown at Fig. 1 is located in the basement close to the meter and the manual controlling valve may be located closely adjacent thereto. However, if desired, the controlling valve may be in an upper room or at some other point in the building remote from the main valve. As shown in Fig. 3, the chamber 38 communicates by a pipe 42 with the supply pipe 1. Chamber 40 communicates with a pipe 14 leading to the top of the diaphragm casing. Consequently, wherever the manually controlled valve is located these two pipes would, of necessity, run to the basement or to the place where the main operating valve is located. Chamber 39 communicates with the discharge pipe 3 or to the system of outlet pipes to which it is connected. It therefore does not need to extend clear to the main operating valve but may be connected to the nearest one of the branch outlet pipes marked 3ᵃ, in Fig. 3. Chamber 41 communicates with the atmosphere, and if required by the regulations of the fire underwriters this chamber 41 may communicate by way of a pipe 43 with the open air outside of the building.

Referring now to Figs. 6, 7 and 8, it will be observed that the plug 32 is provided with ports in three different transverse planes. In the upper plane, represented in Fig. 6, said plug is provided with an L shaped port 44 which, in normal position of the valve, is blanked at one end, but which, when the valve is turned, establishes communication between chambers 40 and 41. In the next lower plane, illustrated in Fig. 7, the plug is provided with a single through port 45, which in normal position of the valve, establishes communication between the chambers 38 and 40, but which is blanked when the valve is turned. In the lower plane, shown in Fig. 8, the plug is provided with a single L shaped port 46, which, in normal position of the valve, is blanked at one end, but which, when the valve is turned, establishes communication between the chambers 38 and 39.

The operation is as follows:

Let us assume the parts in the positions shown in the drawings and that the pressure of the supply is six ounces, or, at any rate, above the pressure at which the valve is desired to operate. The diaphragm 11 is in its upper position and valve 7 is raised from its seat. Consequently the full pressure of the supply is effective in chamber 47 upon the entire area of the diaphragm. Through the manual control valve (see Fig. 7) pressure of the supply is also effective in the chamber or passage 13 but only upon a very restricted portion of the upper surface of the diaphragm, as the chamber 48 above the diaphragm and surrounding the valve seat 12 is trapped. Consequently the pressure on the lower face of the diaphragm preponderates and the parts are held in the position shown.

Let us assume now that the pressure of the supply drops to an abnormal amount, say one-half ounce. When this condition arises the pressure on the lower face of the diaphragm will still preponderate but the total actual pressure thereon will have been reduced to a relatively small amount, indeed, to such an amount as to be unable to support the weight of the diaphragm, rod 15 and the valve parts supported thereby. The weight of these parts is calculated with reference to the area of the diaphragm so that the valve will operate at the desired reduction in pressure Also, by further proportioning of the weight of valve 21 and its effective lower area the parts can be so arranged that after the valve drops the pressure of the supply main must rise to at least a predetermined amount, say one and one-half (1½) ounces before said pressure can become effective to restore the parts to their original open positions. When the pressure is reduced as described the diaphragm and parts supported thereon immediately move downward. As soon as valve 18 leaves its seat the downward movement is assisted by the augmented pressure over the entire upper surface of the diaphragm, as a result of which valve 7 seats and cuts off the flow of pressure to the discharge pipe 3.

If, now, the pressure of the supply rises to an amount above the operating pressure, say to the predetermined pressure of one and one-half ounces (1½) before referred to, or even to its original amount, such rise in pressure will not move the valve, due to the fact that the full pressure of the supply is effective upon the upper face only of the diaphragm, and increase in pressure merely holds said valve more tightly to its seat. In addition, escape of gas or fluid pressure through the moving valve parts is prevented by the check valve 21 which is moved down upon and held to its seat 23 by the pressure in chamber 48.

To restore the parts to operative condition the manual controlling valve is turned to its second position. This operation cuts off the flow of pressure from the supply to the chamber 48, establishes communication through port 44 from said chamber 48 to the atmosphere, and at the same time establishes communication through port 46 from the supply pipe 1 to the discharge pipe 3. As a result the full pressure of the supply is effective upon the bottom of valve 7, while the upper face of the diaphragm 11 is subject only to atmospheric pressure. The first effect of fluid pressure on valve 7 is to raise the valve 21 from its seat 23, whereupon pressure flows through the passage 24 around said check valve and through the ports 27 to chamber 47. The full pressure of the supply becomes effective in chamber 47 and raises the valve 7 from its seat, returning the parts to the positions shown in Fig. 1. When the manual control valve is released the parts remain in the position shown in the drawings until further automatic operation ensues.

This valve is proof against puncture of or injury to the diaphragm. Again assuming the parts in the position shown in the drawings, should the diaphragm be punctured or injured, pressure will flow from the chamber 47 through said diaphragm to the chamber 48, thereby equalizing the pressures above and below said diaphragm. Thereupon the valve parts move downwardly to closing position by gravity and cannot be restored to their original positions until the diaphragm is entirely repaired. This valve must always be either fully open or fully closed, and has no intermediate positions of rest. It is held in either of said positions according to the pressure in the main supply line and upon any serious drop in pressure or injury to the diaphragm drops immediately to fully closed position.

Fig. 2 shows an arrangement in which the main controlling valve also responds to abnormal conditions which may arise as the result of fire. In this arrangement the upper member of the diaphragm casing is provided with a suitable packing surrounding a vertically movable rod 49 lying directly above the valve rod 15. This rod is carried by a frame 50 rotatable about an extension 51 of the diaphragm casing and held thereto by a nut 51ª. The adjustment enables the upper parts to be readily adjusted angularly to accommodate the valve to incoming pipes or to avoid obstructions. In said frame is mounted a valve casing 52 in the chamber 53 of which slides a piston 54 abutting or secured to the outer end of rod 49 and provided with a leak port 54ª. The outer end of the chamber is closed by a cap 55 and the piston therein is normally moved toward the outer end of the chamber by a compression spring 56. 57 represent a pipe communicating with a water supply and leading to the chamber or space 58 behind the piston. 59 represents another pipe communicating with the chamber 53 in advance of the piston and leading to a suitable fire extinguishing apparatus, such as a series of pipes distributed along the ceilings of various rooms of the building and equipped with outlets adapted to automatically open when the temperature of the room rises because of fire.

Under normal conditions all outlets from the fire extinguishing system are closed so that there is no flow of water from said system. Therefore, the piston 54 is held by the spring 56 in the position shown in Fig. 2. However, if as the result of fire one of the outlets from pipe 59 is open, water immediately begins to flow which advances the piston 54 and moves the rod 49 downwardly in Fig. 2. This rod immediately engages the upper end of rod 15 and moves the diaphragm 11 downwardly to unseat the valve 18. As a result the pressures above and below the diaphragm 11 are equalized and valve 7 closes by gravity. Any fire in the building will therefore automatically turn off the entire gas supply and avoid the danger ordinarily arising from open gas pipes in a burning building. When the flow of water is cut off or ceases the pressures equalize on opposite sides of the piston 54 and it is returned to normal position by the spring 56.

Fig. 1 shows a similar arragement in which the piston 54 controlled as aforesaid by the fire extinguishing system, is supported in a casing 52 angularly adjustable on one side of a frame 50ª. This piston operates a rod 49ª similar to the rod 49 but which engages a lever 60 fulcrumed at 61 and having an arm 62 lying above a collar 63 on a rod 64. This rod 64 is in line with the valve rod 15 and operates the same. This arrangement enables the rod 64 to be also operated directly by rise in temperature. For example, the frame 50ª may support a lever 65 pivoted at 66 and engaging a pin or shoulder 67 on rod 64. Said lever is provided with a counterweight 68 and is normally supported in the position shown by a fusible wire 69. If the temperature rises as the result of fire, wire 69 fuses and the weight 68 immediately becomes effective upon the rod 64 to automatically close the valve 7. This arrangement may be used without the water controlled piston 54 if desired. In fact the fluid pressure shut off mechanism may be used alone or with either or both of the above described fire closing devices.

What I claim is:

1. Valve mechanism for fluid pressure conduits, comprising a valve casing communicating with supply and discharge connections, a valve controlling the flow of fluid therethrough, said casing having a chamber and a movable abutment in said chamber for operating said valve, said abutment when the valve is open being subject on its lower face to the pressure of the supply and on its upper face having valve means controlling the flow of fluid thereto, said abutment being so constructed and arranged as to prevent the flow of fluid therethrough.

2. Valve mechanism for fluid pressure conduits, comprising a valve casing communicating with supply and discharge connections, a valve controlling the flow of fluid therethrough, said casing having a chamber and a movable abutment in said chamber for operating said valve, said abutment being subject on its lower face to the pressure of the supply only when said valve is open, and on its upper face having valve means controlling the flow of fluid thereto.

3. Valve mechanism for fluid pressure conduits, comprising a valve casing communicating with supply and discharge connections, a valve controlling the flow of fluid therethrough, said casing having a chamber and a movable abutment in said chamber for operating said valve, said abutment when the valve is open being subject on its lower face to the pressure of the supply and on its upper face having valve means adapted in open position of said valve to restrict the flow of fluid to a portion only of the upper abutment face.

4. Valve mechanism for fluid pressure conduits, comprising a valve casing communicating with supply and discharge connections, a valve controlling the flow of fluid therethrough, said casing having a chamber and a movable abutment in said chamber for operating said valve, said abutment when the valve is open being subject on its lower face to the pressure of the supply and on its upper face having valve means adapted in open position of said valve to restrict the flow of fluid to a portion only of the upper abutment face, and when said valve closes to permit flow of fluid to the entire upper abutment face.

5. Valve mechanism for fluid pressure conduits, comprising a valve casing communicating with supply and discharge connections, a valve controlling the flow of fluid therethrough, said casing having a chamber and a flexible abutment anchored in said chamber for operating said valve, said abutment when the valve is open being subject on one face over its entire area and on its opposite face over a reduced area to the pressure of the supply, and an auxiliary valve within said valve controlling the flow of fluid therethrough.

6. Valve mechanism for fluid pressure conduits, comprising a valve casing communicating with supply and discharge connections, a valve controlling the flow of fluid therethrough, said casing having a chamber and a movable abutment in said chamber for operating said valve, said abutment when the valve is open being subject on one face over its entire area and on its opposite face over a reduced area to the pressure of the supply, and valve means having two positions in one of which communication is established from the supply to the upper face of said abutment and in the other of which communication is established between the upper face of said abutment and the atmosphere.

7. Valve mechanism for fluid pressure conduits, comprising a valve casing communicating with supply and discharge connections, a valve controlling the flow of fluid therethrough, said casing having a chamber and a movable abutment in said chamber for operating said valve, said abutment when the valve is open being subject on one face to the pressure of the supply and on its opposite face to a lower pressure, a check valve within said valve controlling the flow of fluid therethrough, and valve means having two positions in one of which communication is established from the supply to the upper face of said abutment and in the other of which communication is established between the upper face of said abutment and the atmosphere.

8. Valve mechanism for fluid pressure conduits, comprising a valve casing communicating with supply and discharge connections, a valve controlling the flow of fluid therethrough, said casing having a chamber and a movable abutment in said chamber for operating said valve, said abutment when the valve is open being subject on one face over its entire area and on its opposite face over a reduced area to the pressure of the supply, a check valve within said valve controlling the flow of fluid therethrough, and valve means having two positions in one of which communication is established from the supply to the upper face of said abutment and in the other of which communication is established between the upper face of said abutment and the atmosphere.

9. Valve mechanism for fluid pressure conduits, comprising a valve casing communicating with supply and discharge connections, a valve controlling the flow of fluid therethrough, said casing having a chamber and a movable abutment in said chamber for operating said valve, said abutment when the valve is open being subject on its lower face to the pressure of the supply and on its upper face having valve means restricting the flow of fluid to a limited area thereof, and means capable of operation by the flow of fluid in a fire extinguishing system for opening said valve means and permitting the flow of fluid to the entire area of said upper abutment face.

10. Valve mechanism for fluid pressure conduits, comprising a valve casing communicating with supply and discharge connections, valve means controlling the flow of fluid therethrough, a movable abutment for actuating said valve means, said abutment in open position of the valve means being subject on its lower face to the pressure of the supply, means for supplying fluid pressure to the upper face of said abutment, and means whereby in open position of said valve means the pressure supplied to the upper abutment face is effective over a reduced area thereof and upon closing movement of said valve means becomes effective over the entire area of said upper abutment face.

11. Valve mechanism for fluid pressure conduits, comprising a valve casing communicating with supply and discharge connections, valve means controlling the flow of fluid therethrough, a movable abutment for actuating said valve means, said abutment in open position of the valve means being subject on its lower face to the pressure of the supply, means for supplying fluid pressure to the upper face of said abutment, means whereby in open position of said valve means the pressure supplied to the upper abutment face is effective over a reduced area thereof and upon closing movement of said valve means becomes effective over the entire area of said upper abutment face, and means adapted when the valve means is closed to cut off the supply of fluid pressure to the upper face of said abutment and simultaneously apply supply pressure to said valve means for opening the same.

12. Valve mechanism for fluid pressure conduits, comprising a valve casing communicating with supply and discharge connections, valve means controlling the flow of fluid therethrough, a movable abutment for actuating said valve means, and means for cooperating with said abutment and so arranged that when the valve means is open supply pressure is effective over a reduced upper area of said abutment and upon closing movement of said valve means becomes effective over the entire upper abutment area.

13. Valve mechanism for fluid pressure conduits, comprising a valve casing communicating with supply and discharge connections, valve means controlling the flow of fluid therethrough, a movable abutment for actuating said valve means, and means whereby when the valve means is open the supply pressure is effective over a reduced upper area of the abutment and the remaining upper area of the abutment is subject to a trapped lesser pressure and upon closing movement of said valve means supply pressure becomes effective over the entire upper abutment area.

14. Valve mechanism for fluid pressure conduits, comprising a valve casing communicating with supply and discharge connections, valve means controlling the flow of fluid therethrough, a movable abutment for actuating said valve means, said abutment in closed position of the valve means being subject on its upper and lower faces to the pressure of the supply, means for reducing the pressure supplied to the upper face of said abutment and simultaneously increasing the pressure on the lower face of said abutment and valve means for opening the latter, and means adapted when the valve means is fully opened to reduce the area of the upper face of said abutment to which supply pressure is applied, thereby holding the valve means open.

In testimony whereof I affix my signature.

CLAIRE M. LEE.